US012254762B2

(12) United States Patent
Lal et al.

(10) Patent No.: US 12,254,762 B2
(45) Date of Patent: Mar. 18, 2025

(54) DETERMINATION AND AVOIDANCE OF OVER-EXCURSION OF INTERNAL MASS OF TRANSDUCER

(71) Applicant: Cirrus Logic International Semiconductor Ltd., Edinburgh (GB)

(72) Inventors: Anil Lal, Isleworth (GB); Hamid Sepehr, London (GB); Aleksey S. Khenkin, Lago Vista, TX (US); Filippo Rossi, London (GB); Vadim Konradi, Austin, TX (US); Marco A. Janko, Austin, TX (US); Chin H. Yong, Austin, TX (US); Colin Campbell, Austin, TX (US)

(73) Assignee: Cirrus Logic Inc., Austin, TX (US)

( * ) Notice: Subject to any disclaimer, the term of this patent is extended or adjusted under 35 U.S.C. 154(b) by 225 days.

(21) Appl. No.: 18/095,305

(22) Filed: Jan. 10, 2023

(65) Prior Publication Data

US 2023/0245537 A1 Aug. 3, 2023

Related U.S. Application Data

(60) Provisional application No. 63/304,011, filed on Jan. 28, 2022.

(51) Int. Cl.
*G08B 6/00* (2006.01)

(52) U.S. Cl.
CPC .................................... *G08B 6/00* (2013.01)

(58) Field of Classification Search
CPC .................................... G08B 6/00
USPC .................................... 340/407.1
See application file for complete search history.

(56) References Cited

U.S. PATENT DOCUMENTS

| | | | | |
|---|---|---|---|---|
| 6,584,204 | B1 | 6/2003 | Al-Aki et al. | |
| 11,552,649 | B1 * | 1/2023 | Zanbaghi | H03M 3/422 |
| 2018/0014121 | A1 * | 1/2018 | Lawrence | H04R 3/04 |
| 2018/0136899 | A1 * | 5/2018 | Risberg | H04R 3/04 |
| 2018/0160227 | A1 | 6/2018 | Lawrence et al. | |
| 2018/0160228 | A1 | 6/2018 | Hu et al. | |
| 2018/0321748 | A1 | 11/2018 | Rao et al. | |
| 2023/0141666 | A1 * | 5/2023 | Prakash | G06F 3/016 327/100 |
| 2023/0178279 | A1 * | 6/2023 | Prakash | H02K 33/00 361/152 |
| 2023/0237886 | A1 * | 7/2023 | Janko | B06B 1/045 340/407.1 |

OTHER PUBLICATIONS

International Search Report and Written Opinion of the International Searching Authority, International Application No. PCT/US2023/010933, mailed Aug. 28, 2023.

* cited by examiner

*Primary Examiner* — Jack K Wang
(74) *Attorney, Agent, or Firm* — Jackson Walker L.L.P.

(57) ABSTRACT

A method for determining and mitigating over-excursion of an internal mass of an under-damped electromechanical transducer may include transforming an electrical playback signal to an estimated displacement signal, based on the estimated displacement signal, determining an estimated over-excursion of the internal mass responsive to the electrical playback signal, and limiting, based on the estimated over-excursion, an electrical driving signal derived from the electrical playback signal and for driving the electromechanical transducer in order to mitigate over-excursion of the internal mass.

8 Claims, 3 Drawing Sheets

DETERMINATION AND AVOIDANCE OF OVER-EXCURSION OF INTERNAL MASS OF TRANSDUCER

RELATED APPLICATION

The present disclosure claims benefit of U.S. Provisional Patent Application Ser. No. 63/304,011, filed Jan. 28, 2022, which is incorporated by reference herein in its entirety.

FIELD OF DISCLOSURE

The present disclosure relates in general to methods, apparatuses, or implementations for haptic devices. In particular, embodiments set forth herein may disclose systems and methods for detection and prevention of non-linear excursion in a haptic actuator.

BACKGROUND

Vibro-haptic transducers, for example linear resonant actuators (LRAs), are widely used in portable devices such as mobile phones to generate vibrational feedback to a user. Vibro-haptic feedback in various forms creates different feelings of touch to a user's skin and may play increasing roles in human-machine interactions for modern devices.

An LRA may be modelled as a mass-spring electro-mechanical vibration system. When driven with appropriately designed or controlled driving signals, an LRA may generate certain desired forms of vibrations. For example, a sharp and clear-cut vibration pattern on a user's finger may be used to create a sensation that mimics a mechanical button click. This clear-cut vibration may then be used as a virtual switch to replace mechanical buttons.

When driving a haptic transducer with an electrical signal, an internal mass of the haptic transducer may collide with its external housing, which may have undesirable effects, including permanent damage to the transducer, changes to transducer characteristics, undesirable audio artifacts (e.g., a loud "clack" as the internal mass strikes the external housing), and/or distorted haptics effects. Typically, if only "known" content of the form of pre-stored waveforms is played back to a haptic transducer, such collisions may be avoided. However, if playback conditions change or if unknown content is played back (e.g., streaming with audio-to-haptic playback), such collisions may occur. While restricting a playback level for unknown content may mitigate or eliminate such collisions events, such restrictions may weaken haptic effects.

Manufacturers of haptic actuators often specify a maximum signal voltage (e.g., a maximum number of volts, root-mean-square, at a particular frequency) to minimize or eliminate damage. An excursion limit in terms of displacement or distance may be inferred from such voltage limit. However, with unknown playback content, it may be difficult to adhere to a manufacturer's inferred excursion limit for under-damped devices, such as haptic transducers.

Methods and systems for limiting excursion for speakers exist, but often do not work well for under-damped devices. In such approaches for limiting speaker excursion, an attenuation is often applied directly to a driving voltage signal driven to a speaker. However, because haptic transducers are typically under-damped (i.e., have a higher Q factor as compared to loudspeakers), applying a limiting voltage signal directly to drive voltage may not control a mass position such that excursion is limited to a predetermined threshold.

Accordingly, other approaches for preventing over-excursion for haptics transducers and other under-damped devices may be desired.

SUMMARY

In accordance with the teachings of the present disclosure, the disadvantages and problems associated with existing approaches for avoiding over-excursion in a haptic transducer may be reduced or eliminated.

In accordance with embodiments of the present disclosure, a method for determining and mitigating over-excursion of an internal mass of an under-damped electromechanical transducer may include transforming an electrical playback signal to an estimated displacement signal, based on the estimated displacement signal, determining an estimated over-excursion of the internal mass responsive to the electrical playback signal, and limiting, based on the estimated over-excursion, an electrical driving signal derived from the electrical playback signal and for driving the electromechanical transducer in order to mitigate over-excursion of the internal mass.

In accordance with these and other embodiments of the present disclosure, a method for determining and mitigating over-excursion of an internal mass of an underdamped electromechanical transducer may include for each of a set of known playback waveforms, determining a transform for each waveform that minimizes over-excursion of the internal mass based on playback conditions, storing the transforms in memory, and during runtime and playback of a particular known waveform, apply a respective transform associated with the particular known waveform and based on playback conditions.

In accordance with these and other embodiments of the present disclosure, a system for determining and mitigating over-excursion of an internal mass of an under-damped electromechanical transducer may include an electrical drive-to-excursion model configured to transform an electrical playback signal to an estimated displacement signal and an excursion limiter configured to, based on the estimated displacement signal, determine an estimated over-excursion of the internal mass responsive to the electrical playback signal, and limit, based on the estimated over-excursion, an electrical driving signal derived from the electrical playback signal and for driving the electromechanical transducer in order to mitigate over-excursion of the internal mass.

In accordance with these and other embodiments of the present disclosure, a system for determining and mitigating over-excursion of an internal mass of an underdamped electromechanical transducer, the system comprising a memory configured to store, for each of a set of known playback waveforms, a transform for each waveform that minimizes over-excursion of the internal mass based on playback conditions and a controller configured to, during runtime and playback of a particular known waveform, apply a respective transform associated with the particular known waveform and based on playback conditions.

Technical advantages of the present disclosure may be readily apparent to one having ordinary skill in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
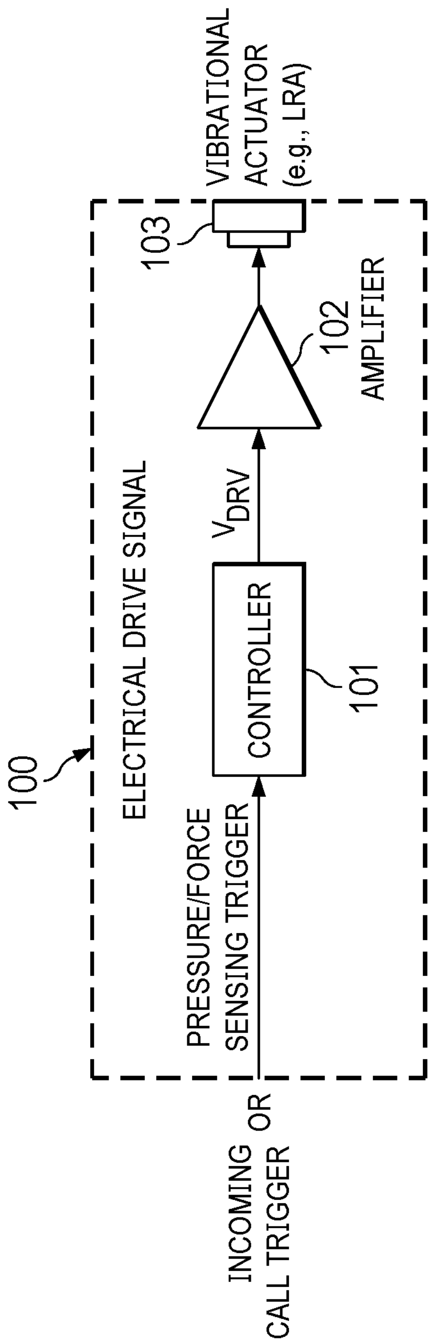
FIG. 1 (PRIOR ART)
FIG. 1 illustrates an example of a vibro-haptic system in a device, in accordance with embodiments of the present disclosure.

FIG. 1 illustrates an example of a vibro-haptic system in a device 100, in accordance with embodiments of the present disclosure. As shown in FIG. 1, device 100 may comprise a controller 101 configured to control a driving signal $V_{DRV}$ applied to an amplifier 102. Controller 101 may be triggered by a trigger to output driving signal $V_{DRV}$. The trigger may, for example, comprise a pressure or force sensor on a screen or virtual button of device 100.

Controller 101 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, controller 101 may interpret and/or execute program instructions and/or process data stored in a memory or other computer-readable medium (not explicitly shown) communicatively coupled to controller 101. In some embodiments, controller 101 may be configured to determine if driving signal $V_{DRV}$ for driving vibrational actuator 103 may lead to over-excursion of an internal moving mass of vibrational actuator 103 and apply displacement-based limits to minimize or eliminate over-excursion, as described in greater detail below.

Amplifier 102 may in turn drive a vibrational actuator (e.g., haptic transducer or other under-damped transducer) 103 based on driving signal $V_{DRV}$. Amplifier 102 may be any system, device, or apparatus configured to amplify a signal received from controller 101 and communicate the amplified signal (e.g., to vibrational actuator 103).

As described above, controller 101 may be configured to determine if driving signal $V_{DRV}$ for driving vibrational actuator 103 may lead to over-excursion of an internal moving mass of vibrational actuator 103 and apply displacement-based limits to minimize or eliminate over-excursion.

To do so, controller 101 may apply a displacement-based transform to a raw electrical driving signal in order to generate a driving signal $V_{DRV}$ for driving vibrational actuator 103 via amplifier 102.

Figure 2:
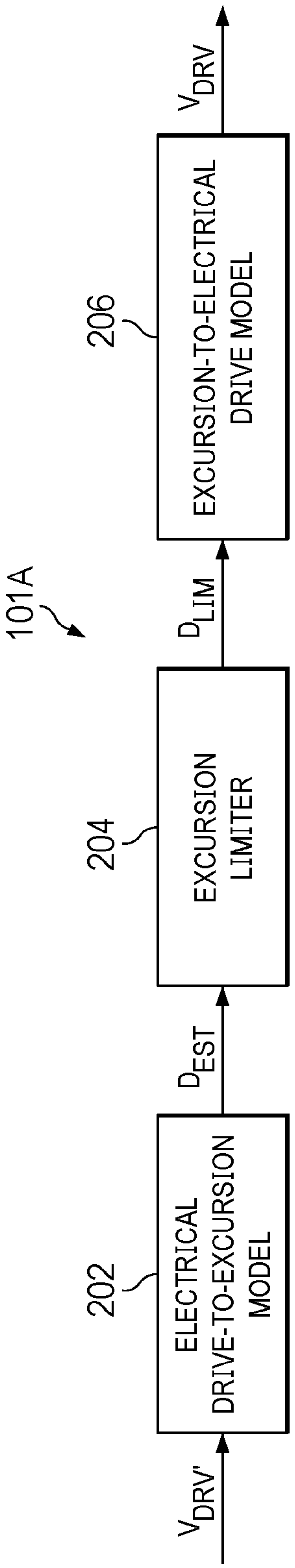
FIG. 2 illustrates selected components of an example controller that may be used to implement the controller depicted in FIG. 1, in accordance with embodiments of the present disclosure.

FIG. 2 illustrates selected components of an example controller 101A that may be used to implement controller 101 depicted in FIG. 1, in accordance with embodiments of the present disclosure. As shown in FIG. 2, controller 101A may include an electrical drive-to-excursion model 202, an excursion limiter 204, and an excursion-to-electrical drive model 206.

Electrical drive-to-excursion model 202 may comprise an electrical drive-to-excursion transfer function such that when the electrical drive-to-excursion transfer function is applied to a raw driving signal $V_{DRV}'$ representing driving signal applied to vibrational actuator 103, the result is an estimated displacement $D_{EST}$ of vibrational actuator 103 if raw driving signal $V_{DRV}'$ were to be hypothetically applied to vibrational actuator 103 (or to amplifier 102 which in turn drives vibrational actuator 103). For example, electrical drive-to-excursion model 202 may be based on characteristics derived from testing and/or characterization of vibrational actuator 103 in response to driving voltages at various frequencies and/or amplitudes.

Figure 3:
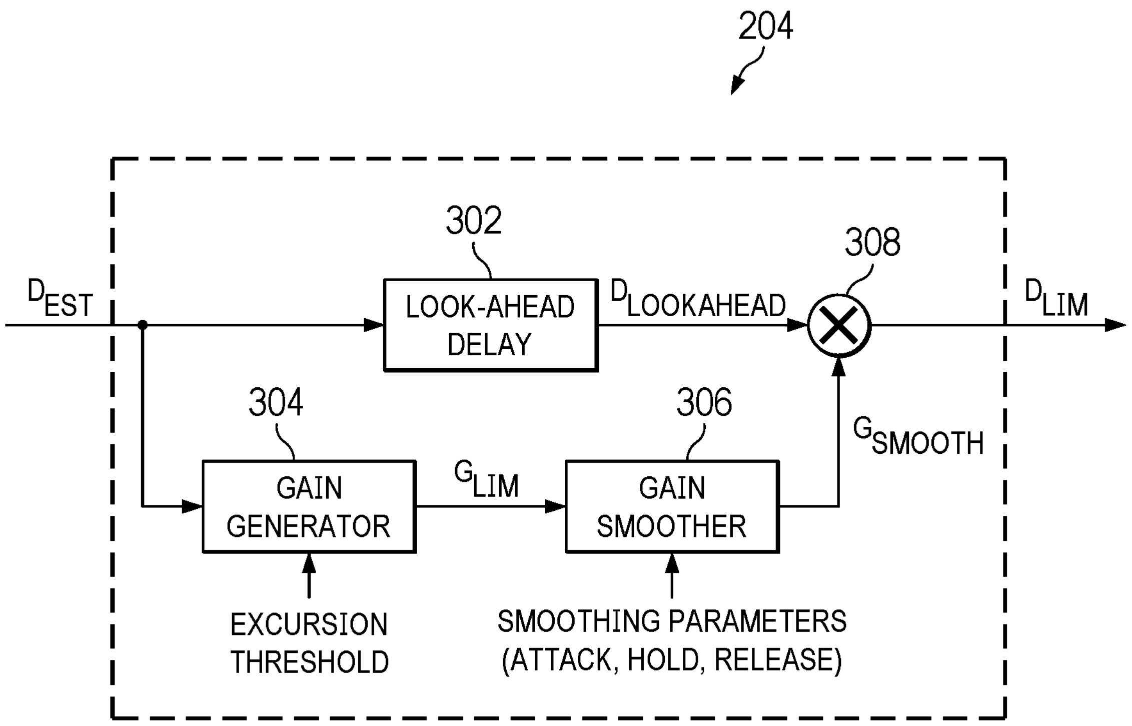
FIG. 3 illustrates selected components of an example excursion limiter, in accordance with embodiments of the present disclosure.

Excursion limiter 204 may apply an excursion threshold (e.g., a maximum safe displacement for the internal mass of vibrational actuator 103) to estimated displacement $D_{EST}$ in order to generate a limited displacement $D_{LIM}$. FIG. 3 illustrates selected components of an example excursion limiter 204, in accordance with embodiments of the present disclosure. As shown in FIG. 3, excursion limiter 204 may include a look-ahead delay element 302, a gain generator 304, a gain smoother 306, and a gain element 308.

Look-ahead delay element 302 may include any suitable system, device, or apparatus configured to add a signal delay to estimated displacement $D_{EST}$ in order to generate look-ahead displacement $D_{LOOKAHEAD}$. Such delay and look ahead may be required in order to detect likely excursion threshold violations and provide signal attenuation before such violations occur.

Gain generator 304 may comprise any suitable system, device, or apparatus configured to, based on an excursion threshold, generate a multiplicative attenuating gain $G_{LIM}$ to look-ahead displacement $D_{LOOKAHEAD}$, in order to maintain displacement of an internal mass of vibrational actuator 103 under such excursion threshold. Gain smoother 306 may generate a smoothed gain $G_{SMOOTH}$ based on smoothing parameters (e.g., attack, hold, release) and/or application of filtering. Gain element 308 may apply smoothed gain $G_{SMOOTH}$ to look-ahead displacement $D_{LOOKAHEAD}$ to generate limited displacement $D_{LIM}$.

Turning again to FIG. 2, excursion-to-electrical drive model 206 may comprise an excursion-to-electrical drive transfer function which may be an inverse transfer function of electrical drive-to-excursion model 202. Accordingly, when the excursion-to-electrical drive transfer function of excursion-to-electrical drive model 206 is applied to a displacement signal representative of an excursion of the internal mass of vibrational actuator 103, the result is driving signal $V_{DRV}$ that, when applied to vibrational actuator 103, maintains the displacement of the internal mass within the excursion threshold.

Figure 4:
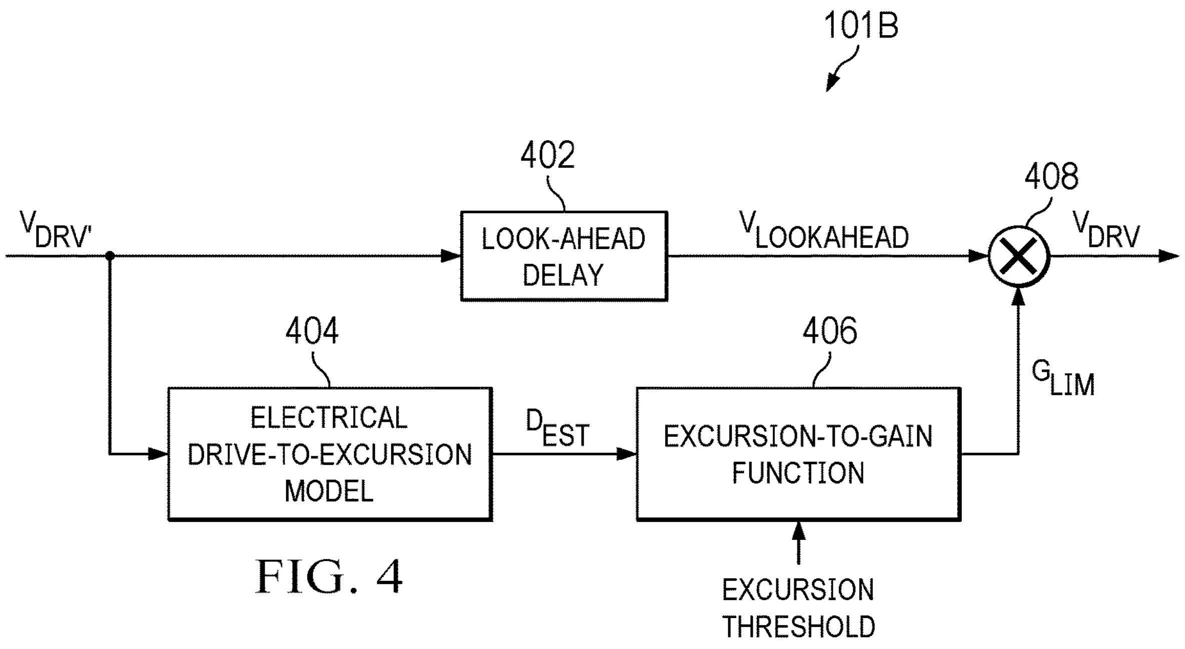
FIG. 4 illustrates selected components of another example controller that may be used to implement the controller depicted in FIG. 1, in accordance with embodiments of the present disclosure.

FIG. 4 illustrates selected components of an example controller 101B that may be used to implement controller 101 depicted in FIG. 1, in accordance with embodiments of the present disclosure. As shown in FIG. 4, controller 101B may include a look-ahead delay element 402, an electrical drive-to-excursion model 404, an excursion-to-gain function 406, and a gain element 408.

Look-ahead delay element 402 may include any suitable system, device, or apparatus configured to add a signal delay to raw driving signal $V_{DRV}'$ in order to generate look-ahead driving signal $V_{LOOKAHEAD}$. Such delay and look ahead may be required in order to detect excursion threshold violations and provide signal attenuation before such violations occur.

Electrical drive-to-excursion model 404 may comprise an electrical drive-to-excursion transfer function such that when the electrical drive-to-excursion transfer function is applied to a raw driving signal $V_{DR}$ v' representing driving signal applied to vibrational actuator 103, the result is an estimated displacement $D_{EST}$ of vibrational actuator 103 if raw driving signal $V_{DR}$\i' were to be hypothetically applied to vibrational actuator 103 (or to amplifier 102 which in turn drives vibrational actuator 103). For example, electrical drive-to-excursion model 202 may be based on characteristics derived from testing and/or characterization of vibrational actuator 103 in response to driving voltages at various frequencies and/or amplitudes. In some embodiments, electrical drive-to-excursion model 404 may be similar or identical to electrical drive-to-excursion model 202 depicted in FIG. 2.

Excursion-to-gain function 406 may comprise any suitable system, device, or apparatus configured to, based on an excursion threshold, generate a multiplicative attenuating gain $G_{LIM}$ to look-ahead driving signal $V_{LOOKAHEAD}$, in order to maintain displacement of an internal mass of vibrational actuator 103 under such excursion threshold. Gain element 408 may apply gain $G_{LIM}$ to look-ahead driving signal $V_{LOOKAHEAD}$ to generate driving signal $V_{DRV}$.

Figure 5:
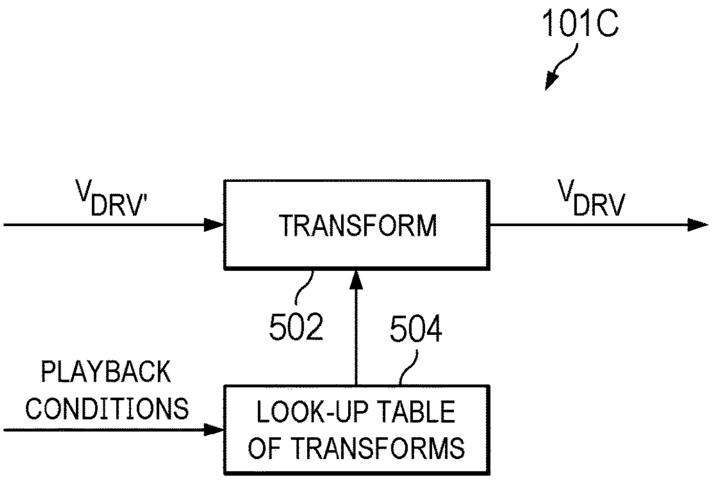
FIG. 5 illustrates selected components of another example controller that may be used to implement the controller depicted in FIG. 1, in accordance with embodiments of the present disclosure.

FIG. 5 illustrates selected components of an example controller 101C that may be used to implement controller 101 depicted in FIG. 1, in accordance with embodiments of the present disclosure. As shown in FIG. 5, controller 101C may include a transform 502 and a look-up table of transforms 504.

In controller 101C, an offline process may be used to analyze known playback content offline and determine a plurality of electrical drive-to-electrical drive transforms for each of the known playback waveforms based on different playback conditions. Examples of playback conditions may include temperature, features of device 100 enabled and disabled, and any other suitable conditions. Such transforms may be stored in lookup-table 504, and during runtime of device 100, controller 101C may detect playback conditions and select a transform 502 from look-up table 504 associated with a known waveform being played back and apply such transform to raw driving signal $V_{DRV}'$ in order to generate driving signal $V_{DRV}$. Such transforms may vary in complexity from simple transforms such as gain or complex transforms such as those that manipulate frequency content and/or dynamic range.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A method for determining and mitigating over-excursion of an internal mass of an under-damped electromechanical transducer, the method comprising:

transforming an electrical playback signal to an estimated displacement signal;

based on the estimated displacement signal, determining an estimated over-excursion of the internal mass responsive to the electrical playback signal; and limiting, based on the estimated over-excursion, an electrical driving signal derived from the electrical playback signal and for driving the electromechanical transducer in order to mitigate over-excursion of the internal mass.

2. The method of claim 1, wherein limiting the electrical driving signal comprises:

applying an excursion threshold to the displacement signal to generate a limited displacement signal; and transforming the limited displacement signal into the electrical driving signal.

3. The method of claim 1, wherein limiting the electrical driving signal comprises:

delaying the electrical playback signal to generate a delayed electrical playback signal;

generating a signal gain based on the estimated over-excursion; and applying the gain to the delayed electrical playback signal to generate the electrical driving signal.

4. A method for determining and mitigating over-excursion of an internal mass of an underdamped electromechanical transducer, the method comprising:

for each of a set of known playback waveforms, determining a transform for each waveform that minimizes over-excursion of the internal mass based on playback conditions;

storing the transforms in memory; and during runtime and playback of a particular known waveform, apply a respective transform associated with the particular known waveform and based on playback conditions.

5. A system for determining and mitigating over-excursion of an internal mass of an under-damped electromechanical transducer, the system comprising:

an electrical drive-to-excursion model configured to transform an electrical playback signal to an estimated displacement signal; and an excursion limiter configured to:

based on the estimated displacement signal, determine an estimated over-excursion of the internal mass responsive to the electrical playback signal; and limit, based on the estimated over-excursion, an electrical driving signal derived from the electrical playback signal and for driving the electromechanical transducer in order to mitigate over-excursion of the internal mass.

6. The system of claim 5, wherein limiting the electrical driving signal comprises:

applying an excursion threshold to the displacement signal to generate a limited displacement signal; and transforming the limited displacement signal into the electrical driving signal.

7. The system of claim 5, wherein limiting the electrical driving signal comprises:

delaying the electrical playback signal to generate a delayed electrical playback signal;

generating a signal gain based on the estimated over-excursion; and applying the gain to the delayed electrical playback signal to generate the electrical driving signal.

8. A system for determining and mitigating over-excursion of an internal mass of an underdamped electromechanical transducer, the system comprising:

a memory configured to store, for each of a set of known playback waveforms, a transform for each waveform that minimizes over-excursion of the internal mass based on playback conditions; and a controller configured to, during runtime and playback of a particular known waveform, apply a respective transform associated with the particular known waveform and based on playback conditions.

* * * * *